US006830126B2

(12) United States Patent
Godwin

(10) Patent No.: US 6,830,126 B2
(45) Date of Patent: Dec. 14, 2004

(54) RAPID ESCAPE SYSTEM FOR BUILDINGS

(76) Inventor: Michael Godwin, 8, rue Netter, Cagnes-sur-Mer, 08800 (FR)

(*) Notice: Subject to any disclaimer, the term of this patent is extended or adjusted under 35 U.S.C. 154(b) by 3 days.

(21) Appl. No.: 10/393,118

(22) Filed: Mar. 20, 2003

(65) Prior Publication Data
US 2004/0182646 A1 Sep. 23, 2004

(51) Int. Cl.[7] ................................. A62B 1/00
(52) U.S. Cl. ........................... 182/82; 182/37
(58) Field of Search .................. 182/82, 3, 36, 182/37, 19

(56) References Cited
U.S. PATENT DOCUMENTS

| 4,121,689 A | * | 10/1978 | Bonvin | 182/3 |
| 4,125,172 A | * | 11/1978 | Hatala | 182/19 |
| 4,350,224 A | * | 9/1982 | Jochum et al. | 182/82 |
| 4,499,966 A | * | 2/1985 | Milne et al. | 182/3 |
| 4,664,226 A | * | 5/1987 | Centanne | 182/82 |
| 5,671,824 A | * | 9/1997 | Keegan et al. | 182/82 |

* cited by examiner

Primary Examiner—Alvin Chin-Shue
(74) Attorney, Agent, or Firm—Glasgow Law Firm, PLLC

(57) ABSTRACT

A rapid escape system for buildings including at least one ride unit for a corresponding at least one building occupant to exit via an elevator-type shaft or tube or down the outside of a building at a rapid, predetermined and substantially constant descent velocity. The system includes a lightweight tuned open frame AC linear electromagnetic power generator with one active half fixed to a backpack/ride on which a person or other object/load can be securely fastened, the other active half fixed top to bottom to a tall structure. When coupled magnetically via the air gap and moving they form a tuned AC permanent magnet linear electro-magnetic generator.

6 Claims, 9 Drawing Sheets

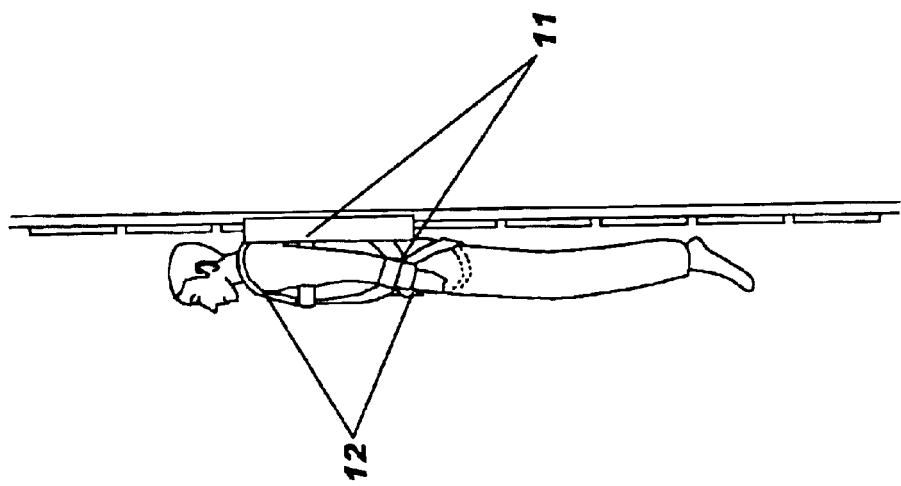

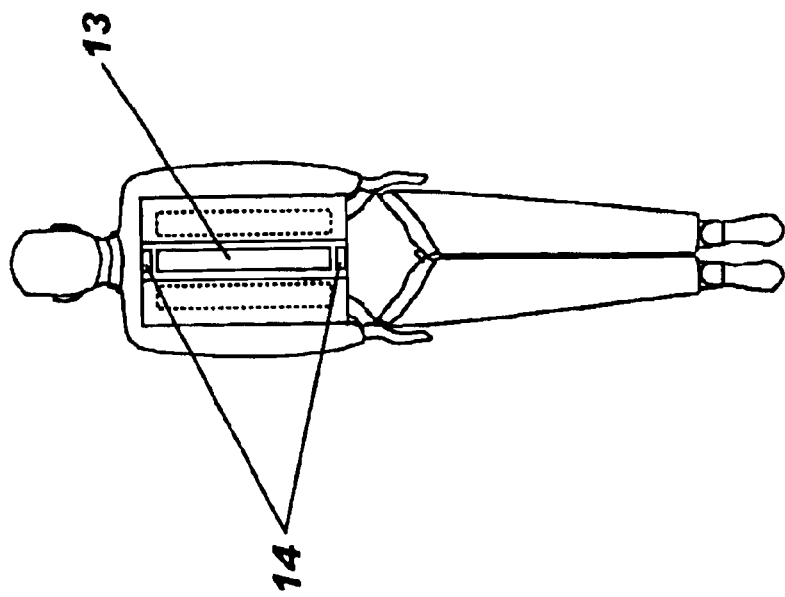

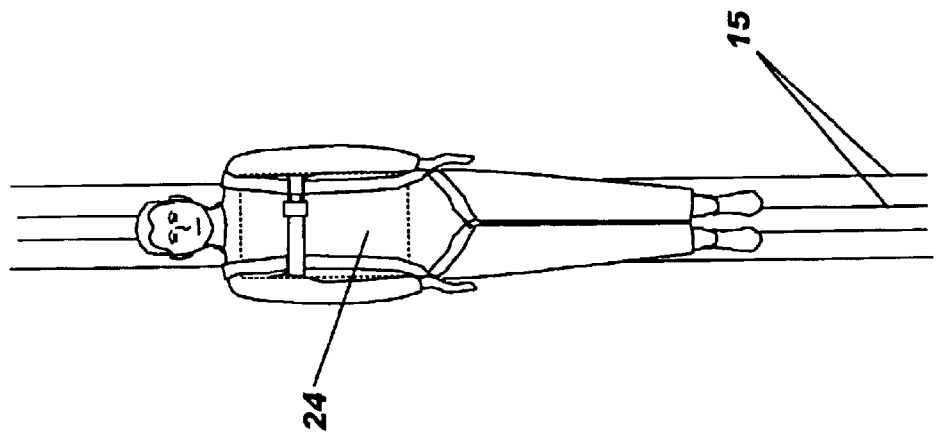

RAPID ESCAPE SYSTEM FOR BUILDINGS

BACKGROUND OF THE INVENTION (1) Field of the Invention

The present invention relates generally to escape systems for buildings and, more particularly, to a rapid escape system and method for rapid and safe individual occupant evacuation of high-rise structures.

(2) Description of the Prior Art

Typically, tall buildings having elevator systems for movement between floors are not well-equipped to handle a mass exodus of building occupants in the event of an emergency, such as a fire, where the elevator systems are rendered non-functional or are not safe for use under such circumstances. Prior art or existing escape systems for low-rise buildings, other than stairs, commonly employ or rely upon friction braking to limit each person's descent velocity in an escape tube. However, for tall buildings, in particular those greater than about 30 meters and reaching above 300 m high, simple friction braking using escape tubes are not feasible or practical, due to the heat generated from said friction and lack of capacity to manage the descent velocity, as well as the matter of evacuating large numbers of people from the building within a reasonable time.

Thus, there remains a need for a rapid escape system for buildings, in particular for tall or high-rise buildings, having a self-powered gravity-based escape system for the rapid evacuation of buildings when the elevator systems and/or stairways do not accommodate an orderly mass exodus of the building's occupants safely within a short period of time.

SUMMARY OF THE INVENTION

The present invention is directed to a rapid escape system for buildings, in particular for high-rise buildings, which are primarily reliant on elevators for the movement of the building's occupants between floors therein. In a preferred embodiment, the present invention provides a self-powered gravity operated escape system, including an apparatus having a compact backpack/ride unit(s) fitted with a safety harness available to every building occupants of high-rise buildings or structures for the purpose of safe and rapid escape during an emergency, in particular when the elevator and/or stairs are not capable of handling an orderly evacuation or exodus of occupants.

The present invention is further directed to a method for using said rapid escape system and/or apparatus, in particular for rapid and safe individual occupant evacuation of high-rise structures.

Accordingly, one aspect of the present invention is to provide a rapid escape system for buildings including at least one compact backpack/ride unit, preferably fitted with a safety harness or seat belt, each backpack/ride unit having a one active half of a tuned open frame alternating current (AC) permanent magnet linear electro-magnetic generator constructed of a copper wire wound iron stator(s), and a second half constructed of an active field of permanent magnets fixed top-to-bottom as a track running the full height of the building or structure, thereby providing a rapid escape system for individual occupants of a building.

Another aspect of the present invention is to provide a rapid escape system for buildings including at least one compact backpack/ride unit for transporting an individual between floors of a building, the backpack/ride unit being capable of adapting to a range of weights of an individual while providing a controlled, predetermined descent velocity. Still another aspect of the present invention is to provide a rapid escape system for buildings including at least one backpack/ride unit wherein a multiplicity of individual building occupants may be dispatched downward in series while avoiding contact with each other throughout the descent.

Yet another aspect of the present invention provides a method for using a rapid escape system for buildings including the steps of providing at least one backpack/ride unit for use by an individual building occupant, activating the descent of the backpack/ride with an individual harnesses thereon for a controlled, predetermined descent velocity, and safely transporting the individual from an upper level of the building to a lower level at a constant velocity.

These and other aspects of the present invention will become apparent to those skilled in the art after a reading of the following description of the preferred embodiment when considered with the drawings.

BRIEF DESCRIPTION OF THE DRAWINGS

FIG. 1 shows a side view of a backpack/ride unit constructed according to the present invention.

FIG. 2 shows a rear view of the backpack/ride unit of FIG. 1, further illustrating integral guide wheels, and the three main components.

FIG. 3 shows a front view of the backpack/ride unit of FIG. 1, located in a substantially vertical magnetic guide rail and ready for dispatch.

DETAILED DESCRIPTION OF THE PREFERRED EMBODIMENTS

Figure 6:
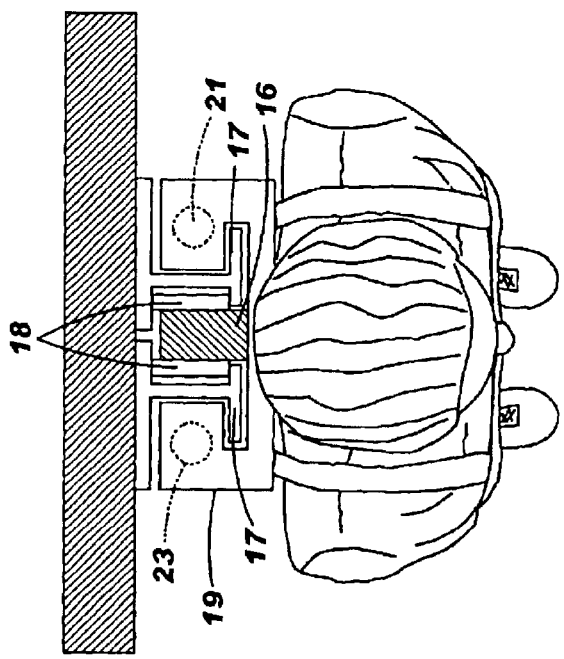
FIG. 6 shows a backpack/ride unit according to an embodiment of the present invention with a person thereon descending in escape mode.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for the purpose of describing a preferred embodiment of the invention and are not intended to limit the invention thereto. The figures collectively and individually illustrate a rapid escape system according to the present invention, generally referenced 10, and its components, respectively. As illustrated in FIG. 1, a backpack/ride unit with a harness 11 according to one embodiment of the present invention is depicted. The backpack/ride unit with harness 11 has securing straps 12. The overall backpack/ride unit is preferably lightweight, the container and harness being made of a synthetic or plastic material to enable easy movement from storage to its dispatch position within the system according to the present invention.

Alternatively, the ride can be a chair unit with a seat is preferably arranged to be hinged with securing straps. The overall chair unit, including the seat, is preferably lightweight, being made of a synthetic or plastic material, with the exception of the stator, and is suspended from a hanger rail to enable easy movement from storage to its dispatch position within the system according to the present invention. The chair units are preferably designed to automatically collapse for ready removal from the track at the exit point, e.g., via spring-loaded hinged connections at predetermined locations in the chair construction, for example at the back and seat interface; as such, the user can readily remove the chair upon exiting the system.

Referring now to FIG. 2, an integral part of the backpack/ride unit, a one active half of a tuned AC permanent magnet linear electro-magnetic generator 13, is shown positioned such that in conjunction with guide rollers 14 the backpack/ride can be positioned to magnetically couple via air gap 18 with the other half or halves of a tuned AC permanent magnet linear electro-magnetic generator fixed from top to bottom of a tall building or structure within which the present invention provides a rapid escape system.

Figure 4:
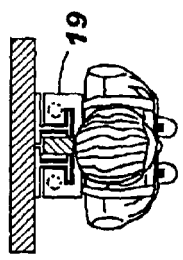
FIG. 4 shows a sectional view of the backpack/ride unit and guide rail in position with both active halves of the tuned AC permanent magnet linear electro-magnetic generator magnetically coupled across an air gap, according to the present invention.
Figure 5:
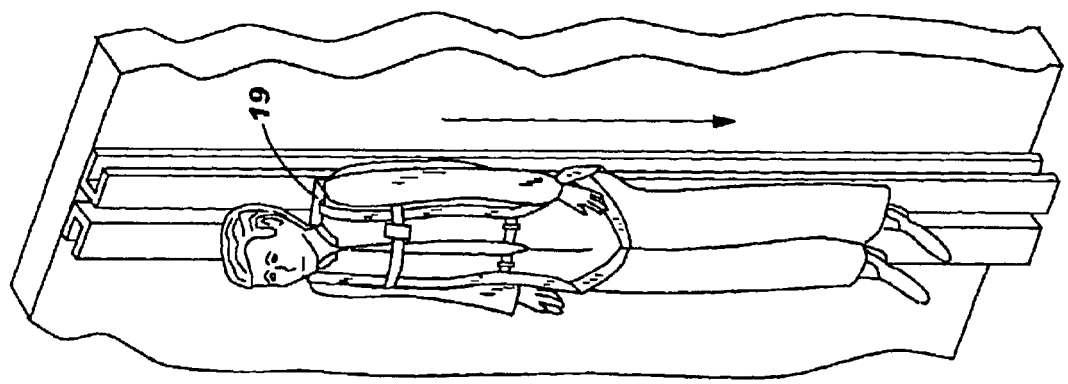
FIG. 5 shows a detailed view of the two active parts, namely a copper wire wound moving iron stator and a stationary permanent magnet vertical track with (C) and (k) in place.
Figure 10:
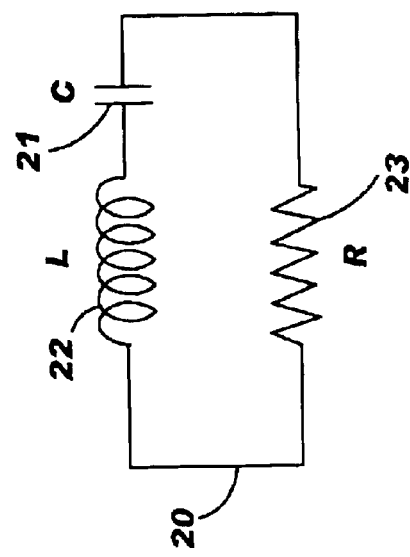
FIG. 10 shows a schematic of the tuned AC permanent magnet linear electro-magnetic generator series circuit comprising Inductance (L), Capacitance (C), and Resistance (R).
Figure 9:
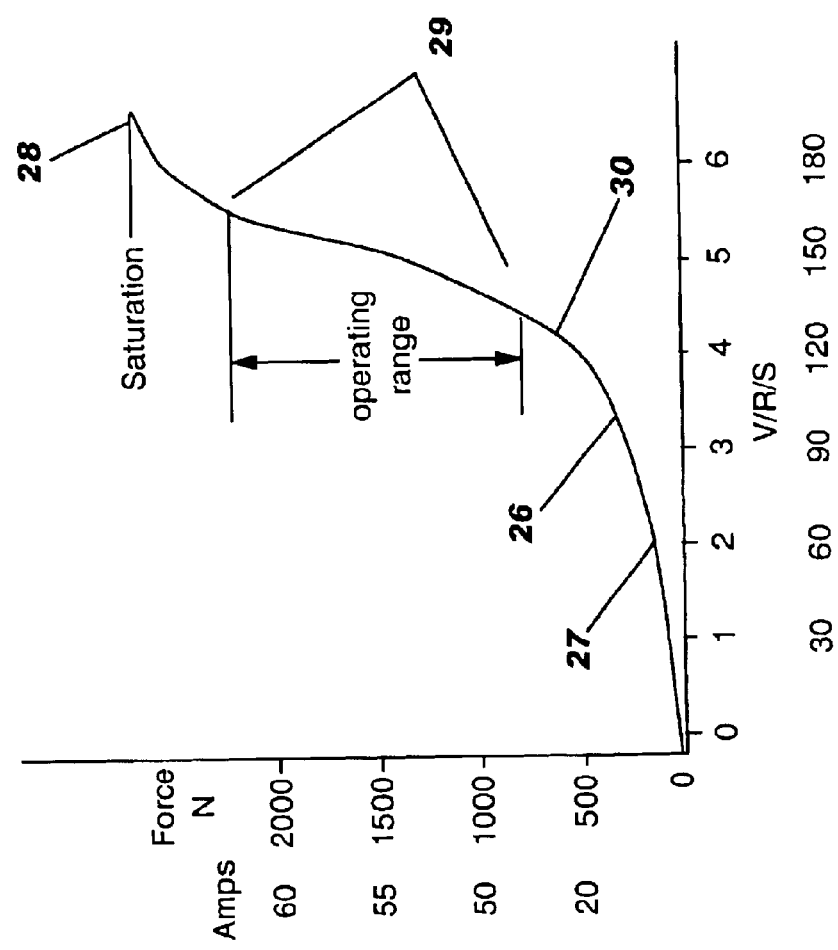
FIG. 9 shows a modified universal resonance curve of the Force (Newtons) generated in the air gap against Velocity (meters per second) and its equivalent frequency.
Figure 11:
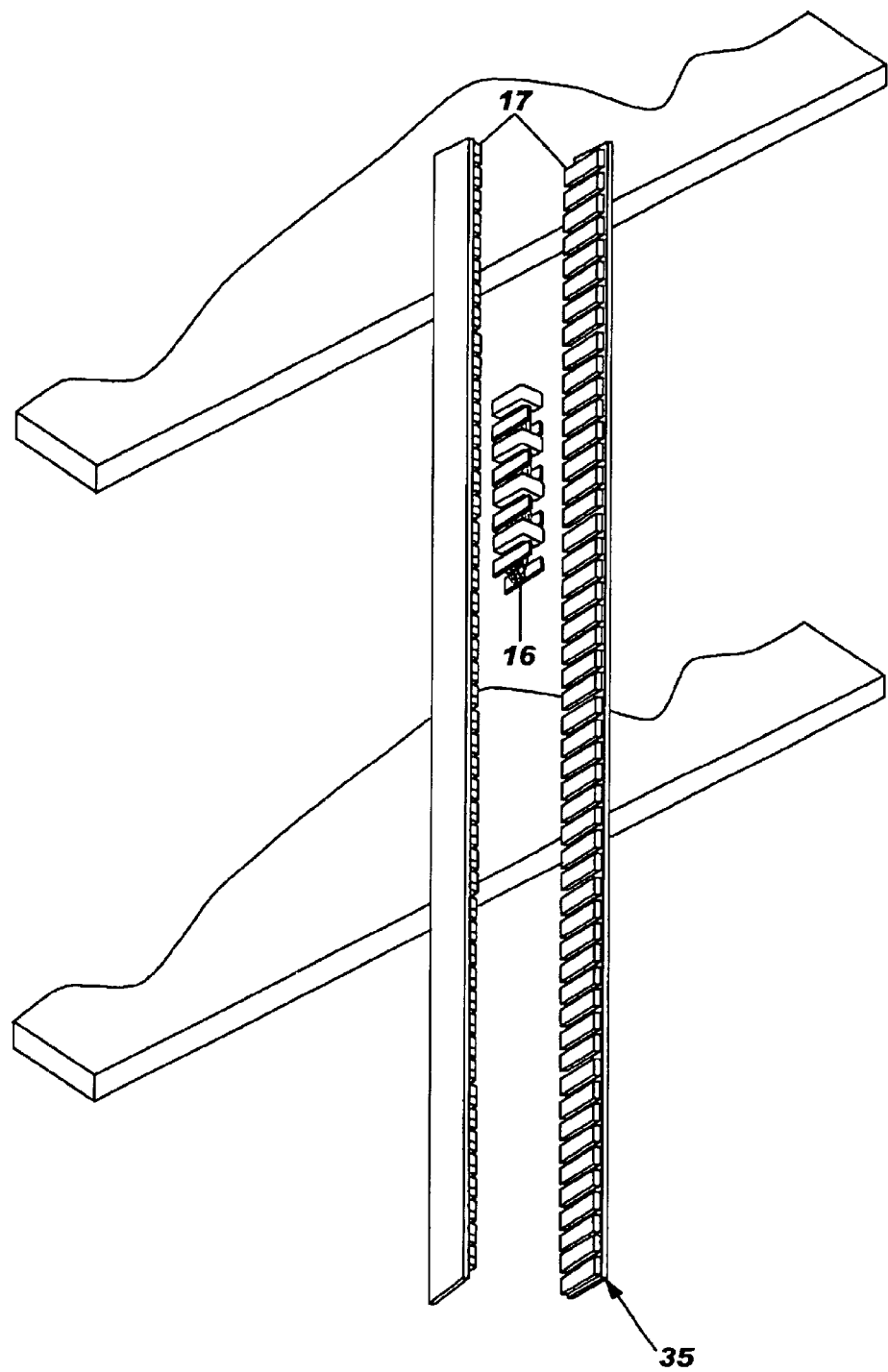
FIG. 11 shows a descending the copper wire wound moving iron stator of a multiple lightweight tuned AC linear electromagnetic generator of double-sided "claw" type construction to which a backpack/ride unit can be attached in operational location between a plurality of permanent magnets that form the vertical guide rail and track. The permanent magnets, which are alternately North South polarity fixed to the backing iron, correspond to the pole pitch of the tuned AC linear electromagnetic generator.
Figure 12:
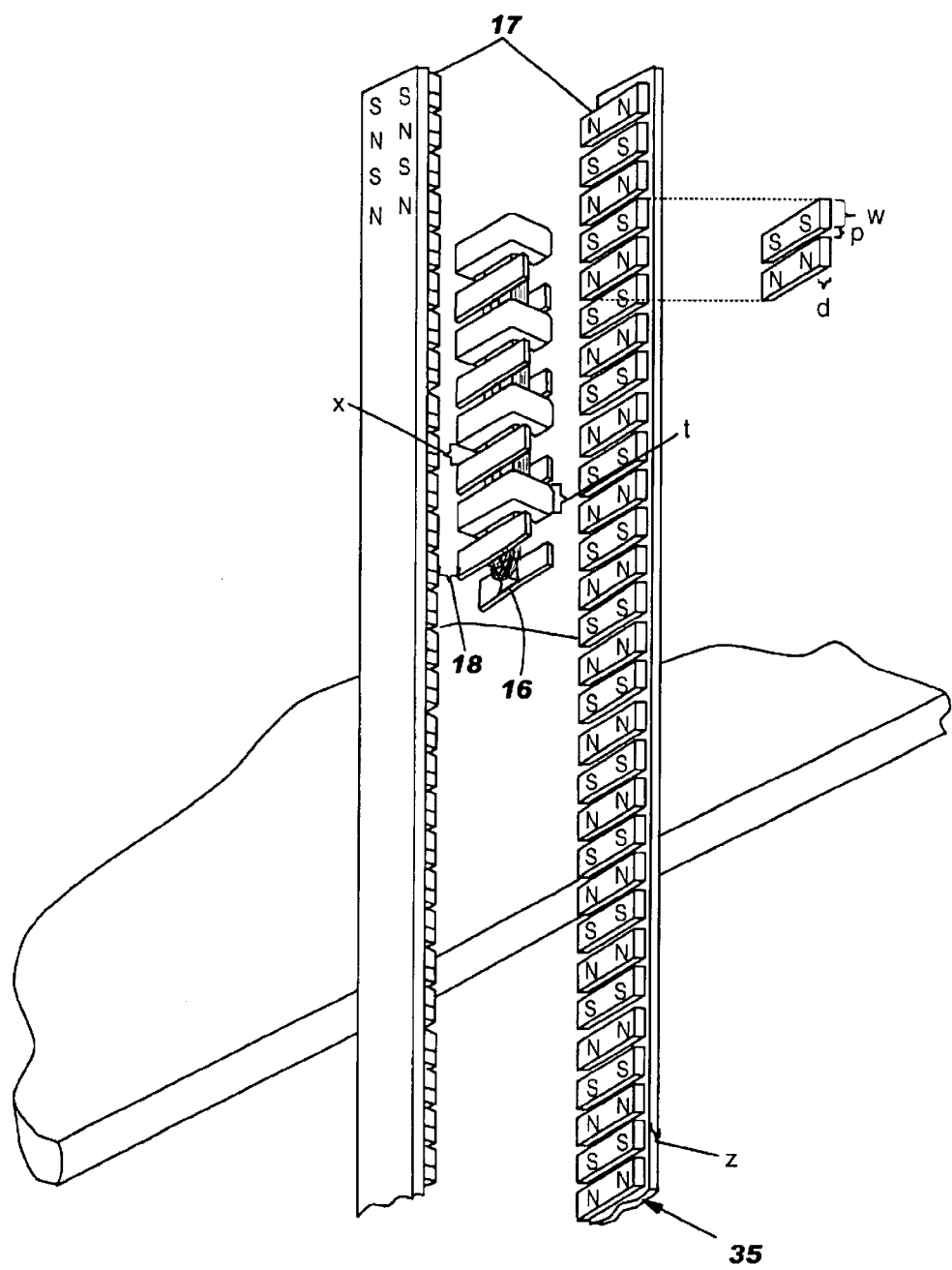
FIG. 12 shows a close-up view of the copper wire wound moving iron stator of FIG. 11.
Figure 13:
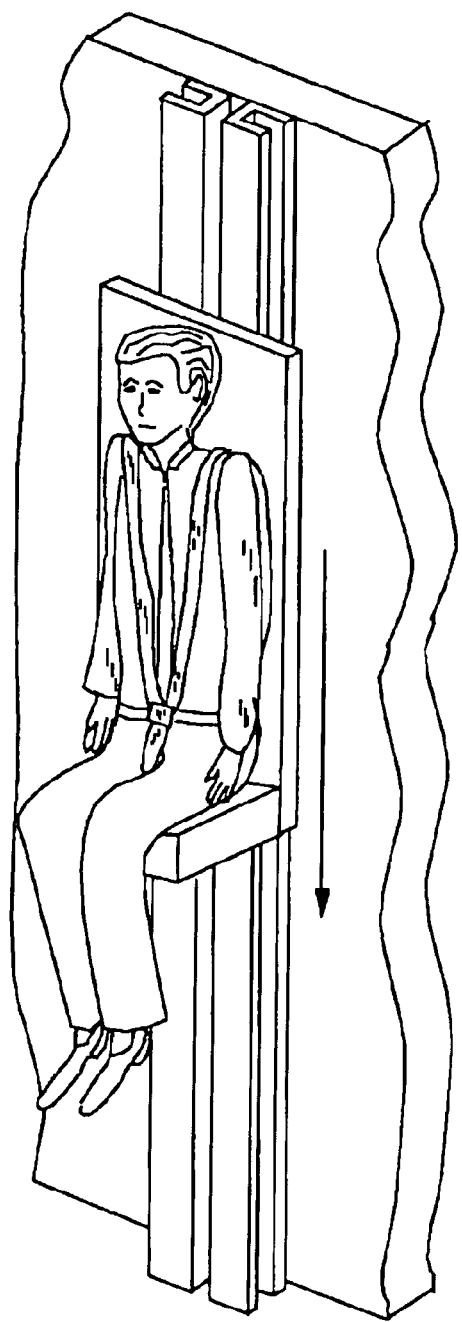
FIG. 13 shows a chair/ride unit according to an embodiment of the present invention with a person thereon in a seated position descending in escape mode.

An individual person 24 located on the backpack/ride unit and secured in some manner by a harness or safety belt is depicted in FIG. 3 as being ready to be assisted by a competent authorized person(s) into the dispatch area where guide rollers engage a track 15 and magnetically coupling both halves of the tuned AC permanent magnet linear electro-magnetic generator prepare for imminent dispatch, as illustrated in FIG. 4. It is an object of the invention to provide for rapid escape and evacuation of building occupants from the building using the present invention. FIG. 5 shows FIG. 4 in more detail, including in particular the two halves of the tuned AC permanent magnet linear electromagnetic generator, namely the resonant tuned generator with series circuit including the moving copper wire wound iron stator 16 and at least one capacitor 21 and any load resistance 23 on the backpack/ride unit and the permanent magnet stationary vertical track 17 that forms the guide for the backpack/ride units, magnetically coupled across an air gap 18 in which the retarding force, shown in FIG. 9, is generated once the backpack/ride unit is dispatched in the system. The half of the open frame tuned AC permanent magnet linear electro-magnetic generator integral with the backpack/ride unit 19 includes its copper winding resistance and inductance which together with the external capacitor (C) 21 and any load resistance (R) 23 forms the series tuned circuit 20 shown in FIG. 10. As shown in FIGS. 5, 11, and 12, the vertical guide rail and track includes the permanent magnets 17 and backing iron 35. The magnets are alternately North South polarity fixed to the backing iron, as shown in FIG. 12, and correspond to the pole pitch of the tuned AC linear electromagnetic generator.

In an example embodiment of the present invention, shown in FIG. 12, the magnets have dimensions d=13 mm and w=12 mm, and spacing p=3 mm. The backing iron has thickness z=10 mm. The stators have thickness t=10 mm and spacing x=5 mm.

Once a backpack/ride unit and secured person 24 has been located in the substantially vertical track ready for dispatch as illustrated in FIG. 6, the backpack/ride unit and harnessed person is released and accelerates under gravity, with this force being far in excess of any friction force that could restrain the backpack/ride unit(s) in descent.

Importantly and significantly in the present invention, movement of one half of the tuned AC permanent magnet linear electro-magnetic generator, i.e. backpack unit, relative to the other half generates an alternating electro-motive force that causes some current to flow in the tuned AC permanent magnet linear electro-magnetic generator series circuit 20, and hence produces some force opposing the descent movement of the backpack/ride unit and person. Correspondingly and consequently, the frequency of the electro-magnetic force and its amplitude will rapidly increase so that in less than one (1) second of free fall the series circuit will approach resonance and sufficient AC current will circulate to generate the retarding force necessary to oppose any further increase in descent velocity of the backpack/ride unit and person, thereby providing a predetermined, controlled descent velocity for ensuring a safe descent of the backpack/ride unit and person within the rapid escape system for buildings according to the present invention.

FIG. 9 illustrates the manner in which the retarding force builds up 26 within the first second of free fall of the backpack/ride and person on the track within the system, where the alternating electro-motive force amplitude and its frequency rapidly rise, however, the alternating current, and hence the retarding force it produces initially stays more or less constant until the frequency/descent velocity approaches the base of the resonance curve 27. At this point, the AC resistance of the tuned open frame AC permanent magnet linear electro-magnetic generator 16 becomes neutralized by the action of the AC resistance of the Capacitor (C) 21 being of opposite sign resulting in the AC current being allowed to rise limited only by the tuned open frame AC permanent magnet linear electro-magnetic generator 16 resistance and any external resistance 23. This rise in current proportionally increases the retarding force generated in the air gap 18. Any further increase in descent velocity causes the retarding force to build up very quickly, which prevents any further acceleration under gravity of the ride unit and person 24, therefore the descent of the unit and person within the system continues for the remainder of the descent at a substantially constant, predetermined velocity, e.g., about 5 m/s.

Importantly, the predetermined, controlled velocity for descent of the backpack/ride and person, is substantially determined by the values of the passive components, namely, inductance of the tuned open frame AC permanent magnet linear electro-magnetic generator (L) 22, capacitance (C) 21 and resistance (R) 23 and the limits imposed by the magnetic saturation 28 of the iron in the tuned AC permanent magnet linear electro-magnetic generator 16. To ensure that the descent velocity never reaches the peak of the resonance curve shown in FIG. 9, an appropriate selection of the passive components within the series circuit according to the present invention, comprising L, C, and R shown in FIG. 10 must be made together with the appropriate sizing of the tuned AC permanent magnet linear electro-magnetic generator 16 such that an adequate retarding force will always be generated over the operating range 29 providing an inherent safety factor for the system, which will accommodate the maximum variation of weights of loaded backpack/ride units, which variation is mainly dependent upon the weight ranges for individual persons or building occupants. This narrow operating range 29 is achieved by designing the Q factor of the resonant series circuit to be of value that ensures the steepness 30 of the side of the modified universal resonance curve is great enough to result in an substantially constant predetermined, controlled descent velocity for varying weights of loaded backpack/ride units of the system. Q being equal to XL/R, i.e. the AC resistance of winding divided by DC resistance of winding. The Q factor determines exclusively the extent to which the current in the moving stator and hence the magnitude of the retarding force increases with increasing frequency. For a Q of 20 and a resonant frequency of about 150 Hz, i.e. approximately 5 m/s, the current in the winding and hence the retarding force will increase by a factor of 2.25 as the frequency and descent velocity approaches resonance for a frequency change of 7.5 Hz equivalent to 0.25 m/s. This is the principle by which a substantially constant speed is achieved for variations in body weight thus permitting a fast serial flow of individuals over a descent of 300 m at 2-second intervals substantially without contact being made.

The key factor of the tuned open frame AC permanent magnet linear electro-magnetic generator is its unique "claw" design that results in not only being lightweight and having sufficient number of poles to generate enough retarding force and power without encountering saturation but also having a high ratio of reactance to resistance enabling it to be capable of having a reasonably high Q. Q being equal to XL/R, i.e. AC resistance of winding divided by DC resistance of winding. In practice the simple series tuned circuit can successfully operate over a wide speed range and in the example illustrated by the figures and built as a prototype of the present invention, the speed can be as low as approximately 0.5 meters/second. Weight of the generator is also important, being approximately 6 kg as is its small size being only approximately 2"×2"×18" long for this double-sided "claw" type construction.

Figure 7:
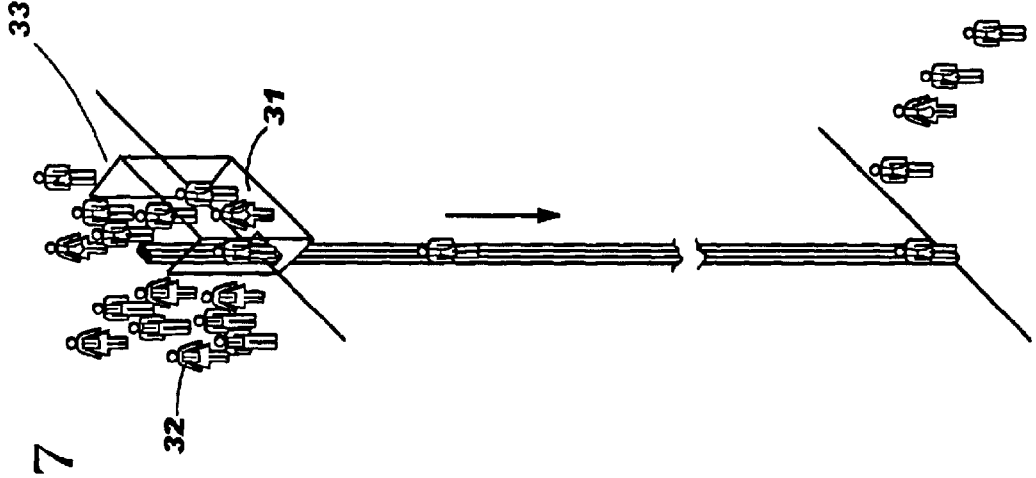
FIG. 7 shows a typical deployment of the backpack/ride units that are harnessed to each occupant at a muster station balcony ready for dispatch, and in final dispersal at exit level.

Preferably, according to one embodiment of the present invention, a multiplicity of backpack/ride units are used with the system for deployment in spaced apart series for rapid escape or evacuation of a multiplicity of building occupants in the event of an emergency. FIG. 7 depicts a means of dispatching the backpack/ride units from a deployed balcony 31 secured to the cladding of the tall building's exterior. Backpack/ride units might be stored on every level/floor of the building and each occupant takes one 32, straps it on himself and proceeds to the muster station 33. An authorized person permits an orderly flow of occupants via the balcony to allow each backpack/ride unit to engage the vertical magnetic track 15 whereupon the trapdoor 31 is lifted and the backpack/ride unit with occupant begins the descent to exit level. By this means a stream of occupants with backpack units is dispatched at not more than approximately 2 second intervals.

Figure 8:
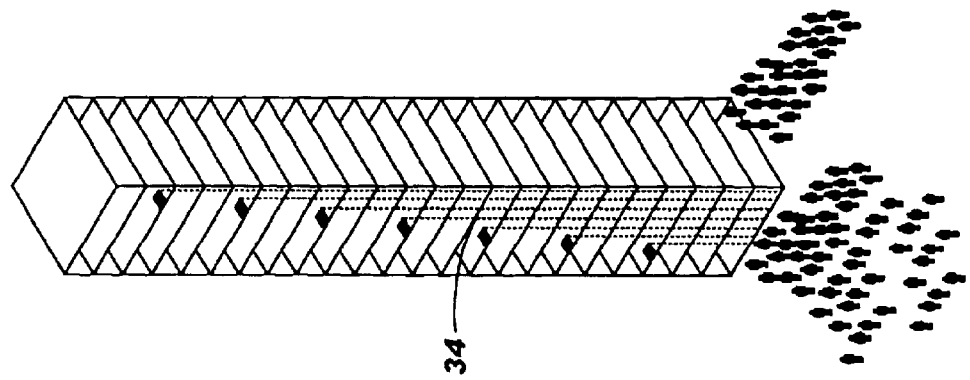
FIG. 8 shows a tall building during simultaneous evacuation of occupants from muster stations located throughout the building.

FIG. 8 illustrates a multiplicity of backpack/ride units descending 34 with persons as they approach and continue to exit at the ground level of the building. In a preferred embodiment of the present invention, the descent velocity approaching ground level can be slowed by additional braking force provided by the backpack/ride unit having additional aluminum conductor plates which engage the permanent magnet track to produce eddy current braking and so reduce the final velocity of the backpack/ride unit to a point where occupants have time to safely release themselves. The tuned generator 16 is capable of providing adequate retarding force over a wide range from about 0.5 m/s to about 10 m/s and therefore additional eddy current braking may not be required; however, as the permanent magnet track is available, this additional braking using an aluminum or copper conductor could be useful in providing a basic level of retarding force so permitting a smaller size of tuned moving stator to be used.

In certain cases, an embodiment other than a harness might be more suitable. In those cases, other ride embodiments can be used, such as chair-types, pogo stick-types, and the like, without departing from the scope of the invention.

Certain modifications and improvements will occur to those skilled in the art upon a reading of the foregoing description. By way of example, the present invention could also be used in construction applications for transporting persons and/or objects, in particular if in an emergency a rapid escape from a tall structure under construction were necessary. Also, the system could be used as an emergency catch system for window washers. All modifications and improvements have been deleted herein for the sake of conciseness and readability but are properly within the scope of the following claims.

I claim:

1. A gravity operated escape apparatus not requiring any external power supply, comprising at least one compact ride unit provided for a corresponding at least one building occupant, each of the at least one compact ride units includes a first half of a tuned AC linear electro-magnetic generator, magnetically coupled and moving relative to a second half including a stationary plurality of permanent magnets in the form of a fixed channel track extending from top to bottom of a tall building, said electro-magnetic generator becomes sufficiently excited at a predetermined descent velocity to generate a magnitude of AC current such that a retarding force due to that current counterbalances the gross weight of each of the at least one backpack/ride unit and its occupant when descending the track, the predetermined descent velocity controlled by a Q factor of a resonant tuned series circuit with passive components including an inductance of a winding of the tuned generator plus external resistance and capacitor that neutralizes an AC resistance of the generator winding inductance to permit sufficient current to flow in the series circuit to provide the adequate retarding force while at the same time allowing some variation in gross weights of occupants to be accommodated with minimum variation in descent velocity.

2. The apparatus according to claim 1, wherein the at least one compact ride unit is of a backpack-type construction.

3. The apparatus according to claim 1, wherein the at least one compact ride unit is of a chair type construction.

4. The apparatus according to claim 1, wherein the tuned AC linear electromagnetic generator is magnetically proportioned such that when coupled with the stationary permanent magnet track and descending with occupant, current in the tuned generator does not rise to a point where a magnetic circuit of the tuned generator becomes saturated and no further increase in retarding force is generated.

5. The apparatus according to claim 1, wherein the Q factor of the circuit of the tuned AC permanent magnet linear electro-magnetic generator regulates the descent velocity such that varying weights between more than one of the at least one compact backpack ride unit and respective occupants do not cause significant variation in the descent velocity.

6. The apparatus according to claim 1, wherein the permanent magnet half of the tuned AC permanent magnet linear electro-magnetic generator is brought into close proximity of a conducting element to induce eddy current to provide a braking force acting upon a descending occupied backpack/ride unit of the at least one backpack/ride units such that the descent velocity at a lower level of the building is reduced.

* * * * *

UNITED STATES PATENT AND TRADEMARK OFFICE
CERTIFICATE OF CORRECTION

PATENT NO.   : 6,830,126 B2                                                         Page 1 of 1
DATED        : December 14, 2004
INVENTOR(S)  : Michael Godwin It is certified that error appears in the above-identified patent and that said Letters Patent is hereby corrected as shown below:

Column 19,
Line 23, after the word "generator", the comma should be deleted.

Signed and Sealed this

First Day of March, 2005

JON W. DUDAS
*Director of the United States Patent and Trademark Office*